United States Patent
Essing et al.

(10) Patent No.: US 11,661,228 B2
(45) Date of Patent: May 30, 2023

(54) VACUUM DRUM FOR A LABELING UNIT, LABELING UNIT HAVING SUCH A VACUUM DRUM, AND METHOD FOR PRODUCING A VACUUM DRUM

(71) Applicant: KHS GmbH, Dortmund (DE)

(72) Inventors: Jens Essing, Dortmund (DE); Klaus Kraemer, Dortmund (DE)

(73) Assignee: KHS GmbH, Dortmund (DE)

( * ) Notice: Subject to any disclaimer, the term of this patent is extended or adjusted under 35 U.S.C. 154(b) by 34 days.

(21) Appl. No.: 17/417,271

(22) PCT Filed: Jan. 16, 2020

(86) PCT No.: PCT/EP2020/051010
§ 371 (c)(1),
(2) Date: Jun. 22, 2021

(87) PCT Pub. No.: WO2020/148375
PCT Pub. Date: Jul. 23, 2020

(65) Prior Publication Data
US 2022/0073228 A1   Mar. 10, 2022

(30) Foreign Application Priority Data
Jan. 18, 2019 (DE) .............. 10 2019 101 301.1

(51) Int. Cl.
*B65C 9/18* (2006.01)
*B33Y 80/00* (2015.01)
(Continued)

(52) U.S. Cl.
CPC ............ *B65C 9/1819* (2013.01); *B22F 10/20* (2021.01); *B33Y 80/00* (2014.12); *B29C 64/10* (2017.08); *B33Y 10/00* (2014.12)

(58) Field of Classification Search
None
See application file for complete search history.

(56) References Cited

U.S. PATENT DOCUMENTS

| 4,542,907 A | 9/1985 | Chiba et al. |
| 5,116,452 A * | 5/1992 | Eder ............... B65C 9/1819 156/566 |
| 2009/0078363 A1* | 3/2009 | Kramer ............ B65C 9/1819 156/538 |
| 2009/0236023 A1* | 9/2009 | Lingier ............ B65C 3/065 156/60 |

(Continued)

FOREIGN PATENT DOCUMENTS

| CN | 2281972 Y | 5/1998 |
| CN | 1446294 A | 10/2003 |

(Continued)

OTHER PUBLICATIONS

International Search Report, PCT Application No. PCT/EP2020/051010, dated Apr. 28, 2020 (3 pages).

*Primary Examiner* — Mohammad M Ameen
(74) *Attorney, Agent, or Firm* — Occhiuti & Rohlicek LLP

(57) ABSTRACT

A vacuum drum for a labelling unit of a labelling machine has the segments arranged next to each other to collectively form a circumferential surface of the vacuum drum. A typical segment has vacuum-holders that holds ends of the label. The holders are offset along the drum's circumferential surface. The segment also has a carrier plate and a label arc between the first and second vacuum holders. The first vacuum-holder comprises a first housing and the second vacuum holder comprises a second housing. At least one of the carrier plate, the housings, and the label arc is formed by additive manufacturing.

35 Claims, 14 Drawing Sheets

(51) Int. Cl.
*B22F 10/20* (2021.01)
*B29C 64/10* (2017.01)
*B33Y 10/00* (2015.01)

(56) References Cited

U.S. PATENT DOCUMENTS

| | | | |
|---|---|---|---|
| 2011/0168334 A1* | 7/2011 | Kramer | B65C 9/1819 |
| | | | 156/538 |
| 2014/0209247 A1 | 7/2014 | Carmichael et al. | |
| 2017/0166344 A1* | 6/2017 | Carmichael | B65C 9/2247 |

FOREIGN PATENT DOCUMENTS

| | | |
|---|---|---|
| CN | 1784342 A | 6/2006 |
| CN | 1829614 A | 9/2006 |
| CN | 101448708 A | 6/2009 |
| CN | 103523309 A | 1/2014 |
| CN | 104340447 A | 2/2015 |
| CN | 105539973 A | 5/2016 |
| CN | 207725794 U | 8/2018 |
| DE | 102007023519 A1 | 12/2007 |
| DE | 102008053513 A1 | 4/2010 |
| DE | 202010013950 U1 | 12/2010 |
| DE | 102016207824 A1 | 11/2017 |
| DE | 202016105825 U1 | 1/2018 |
| DE | 202016105825 U1 * | 1/2018 |
| DE | 202016107328 U1 | 3/2018 |
| WO | 2007110199 A2 | 10/2007 |

* cited by examiner

VACUUM DRUM FOR A LABELING UNIT, LABELING UNIT HAVING SUCH A VACUUM DRUM, AND METHOD FOR PRODUCING A VACUUM DRUM

RELATED APPLICATIONS

This is the national stage of international application PCT/EP2020/051010, filed on Jan. 16, 2020, which claims the benefit of the Jan. 18, 2019 priority date of German application DE 102019101301.1, the contents of which are herein incorporated by reference.

FIELD OF INVENTION

The invention relates to labeling containers.

BACKGROUND

A vacuum drum is an essentially cylindrical structure having an axial direction and a circumferential direction. Such vacuum drums are used to hold labels that are to be placed on a container. Such a vacuum drum applies the leading edge of a label to the container as the drum rotates. In the process, the container also rotates, thus winding the label onto its own surface.

For each label, a vacuum drum has two vacuum holders, one of which holds the label's leading end and the other of which holds the label's trailing end. The space between the vacuum holders along the drum's circumferential direction thus depends on the length of the label.

Each vacuum holder is a strip arranged along the axial direction. The strip has plural openings that connect to a source of vacuum.

The vacuum holders are also able to transition between an outer working position and an inner waiting position. In the outer working position, the vacuum holders cause a label to interact with a gluing unit that applies glue to the label. In the inner waiting position, the vacuum holders avoid interaction with the gluing unit.

A difficulty that arises is that the vacuum drum is expected to handle labels of different lengths. This requires maintenance of an inventory of vacuum-drum segments, each of which has vacuum holders that are spaced apart along the circumferential axis by different amounts.

SUMMARY

An object of the invention is that of providing a vacuum drum for a labelling unit that can be adjusted to different label formats in a particularly simple and economical manner.

In one aspect, the invention features a vacuum drum for a labelling unit of a labelling machine, in particular for labelling containers or the like, comprising a plurality of segments which are rotatable in a direction of rotation about a drum axis of the vacuum drum, which comprises at least two vacuum holders at a circumferential surface of the vacuum drum, provided offset to one another in the direction of rotation about the drum axis, in each case with a vacuum holder housing, wherein a front vacuum holder, related to the direction of rotation, is provided for holding a front label end of a corresponding label, and a rear vacuum holder, related to the direction of rotation, for holding an associated rear label end on the circumferential surface of the vacuum drum, and wherein the circumferential surface of the corresponding segment of the vacuum drum is formed between the respective front and rear vacuum holders by a circular arc-shaped segment surface portion. The vacuum drum according to the invention is characterized in this situation in particular by the fact that at least the carrier plate and/or the respective vacuum holder housing of the vacuum holder pair and/or the segment surface portion of a segment extending between the front and rear vacuum holders of this vacuum holder pair are produced by means of an additive manufacturing method.

A structure made by additive manufacturing is physically distinguishable from a structure not made by additive manufacturing, or 3D printing, for much the same reason that one can tell the difference between a statue that has been made by being sculpted and one that has been made by joining together discrete parts. In general, it is possible to tell the difference by looking for telltale signs such as joints or cracks that reveal that some assembly has taken place. While such distinctions may seem trivial. However, only proves that the considerable mechanical significance of these distinctions would not be obvious. It is also possible to distinguish structures formed by additive manufacturing from those that have been cast or injection molded because it is possible to create different regions out of different materials.

In some embodiments, the vacuum holder housing of the vacuum holder pair is arranged on the carrier plate by means of one vacuum line, wherein the vacuum line is produced by means of an additive manufacturing method.

In some embodiments, thee vacuum holder housing of the vacuum holder pair is formed as monolithic with the carrier plate by means of the vacuum line and is held in a fixed position at the carrier plate.

In some embodiments, the segment surface portion of the segment, extending between the front and rear vacuum holder of this vacuum holder pair, is arranged on the carrier plate by means of a vacuum line, wherein the vacuum line is produced by means of an additive manufacturing method.

In some embodiments, the segment surface portion of the segment, extending between the front and rear vacuum holders of this vacuum holder pair, is configured by means of the vacuum line as being monolithic with the carrier plate, and is held in a fixed position on the carrier plate.

In some embodiments, the vacuum line comprises an inner line path between the carrier plate and the vacuum holder housing, wherein all the curve sections form a tangential transition.

In some embodiments, the vacuum line between the carrier plate and the segment surface portion extending between the front and rear vacuum holders of this vacuum holder pair comprises an inner line path, wherein all the curve sections form a tangential transition.

In some embodiments, the inner diameter of the vacuum line is arranged along the line path in such a way that, at an outlet of the vacuum line, facing towards the front or rear vacuum holder and/or the segment surface portion extending between the front and rear vacuum holder of this vacuum holder pair, an identical negative pressure is imposed.

In some embodiments, the strut is provided between at least two vacuum channels and/or the segment surface portion and the carrier plate and/or vacuum channel and the carrier plate, which is produced by means of an additive manufacturing method.

In some embodiments, a strut is provided, oriented vertically in relation to the plane spanned by the carrier plate, between the segment surface portion and the carrier plate, into which preferably a vacuum channel is integrated.

In some embodiments, the vertical strut is configured as a fin.

In some embodiments, several vertical struts are provided, between which the strut extends, running horizontally and therefore parallel to the plane spanned by the carrier plate.

In some embodiments, the vacuum channels are integrated into a strut which is formed as a casing surface section.

In some embodiments, the vacuum holder housing of the vacuum holder pair is arranged such as to be adjustable, by means of an adjustment device, to the segment surface portion extending between the front and rear vacuum holders of this vacuum holder pair, relative to the drum axis.

In some embodiments, the segment surface portion extending between the front and rear vacuum holders of this vacuum holder pair is configured as multi-part, in particular as two-part, and comprises first and second part segment surface portions.

In some embodiments, a looped shaft is provided between the first and second part segment surface portions, by means of which the effective circular-arc length of the segment surface portion which is contact with the label can be changed.

In some embodiments, several segments, and preferably all the segments, of the vacuum drum are configured in accordance with one of the foregoing embodiments.

In some embodiments, all the segments of a label type have an identical coding.

The expression "essentially" or "approximately" in the meaning of the invention signifies deviations from the exact value in each case by +/−10%, preferably by +/−5%, and/or deviations in the form of changes which are not of significance for the function.

Further embodiments, advantages, and possible applications of the invention also derive from the following description of exemplary embodiments and from the Figures. In this situation all the features described and/or represented in the Figures are principle the object of the invention, individually or in any desired combination, regardless of their arrangement in the claims or reference to them. The contents of the claims are also deemed to be a constituent part of the description.

As used herein, statements concerning connectedness are not intended to imply the existence of two discrete parts that are connected by a connecting device or adhesive. For example, as used herein, "connected" could be used to say that the handle and skillet of a cast iron pan are "connected" even though there is no discrete connection and even though the cast iron pan is a monolithic structure. The same can be said of a marble statue in which one can say that an arm is connected to a torso even though no visible means of connection exists. This is done because the language appears to lack a word that would otherwise communicate this concept. Should a means for connection be insisted upon, it is always correct to say that interatomic forces exist to connect parts of a monolithic structure together in such a way as to minimize internal energy. Thus, in a monolithic or unitary structure, parts thereof are connected only by interatomic forces and not by external means.

Although a number of aspects have been described in connection with a device, it is understood that these aspects also represent a description of the corresponding method, such that a block element or a structural element of a device is also to be understood as a corresponding method step or as a feature of a method step. By analogy with this, aspects which have been described in connection with, or as, a method step, also represent a description of a corresponding block or detail or feature of a corresponding device. Some or all of the method steps can be carried out by a hardware apparatus (or with the use of a hardware apparatus), such as a microprocessor, a programmable computer, or an electronic circuit. With some exemplary embodiments, some or many of the most important method steps can be carried out by such an apparatus.

BRIEF DESCRIPTION OF THE DRAWINGS

The invention is explained hereinafter on the basis of the Figures in relation to exemplary embodiments. The figures show.

Identical reference numbers have been used in the figures for elements of the invention that are the same or have the same effect. Furthermore, for the sake of easier overview, each figure shows only those reference numbers that are pertinent to the discussion of that figure. to understand the figure.

The invention is also only represented in the figures in schematic views to show the means of operation. In particular, the representations in the figures serve only to explain the basic principle of the invention. For reasons of easier overview, the representation of all the constituent parts of the device has been avoided.

DETAILED DESCRIPTION

Figure 1:
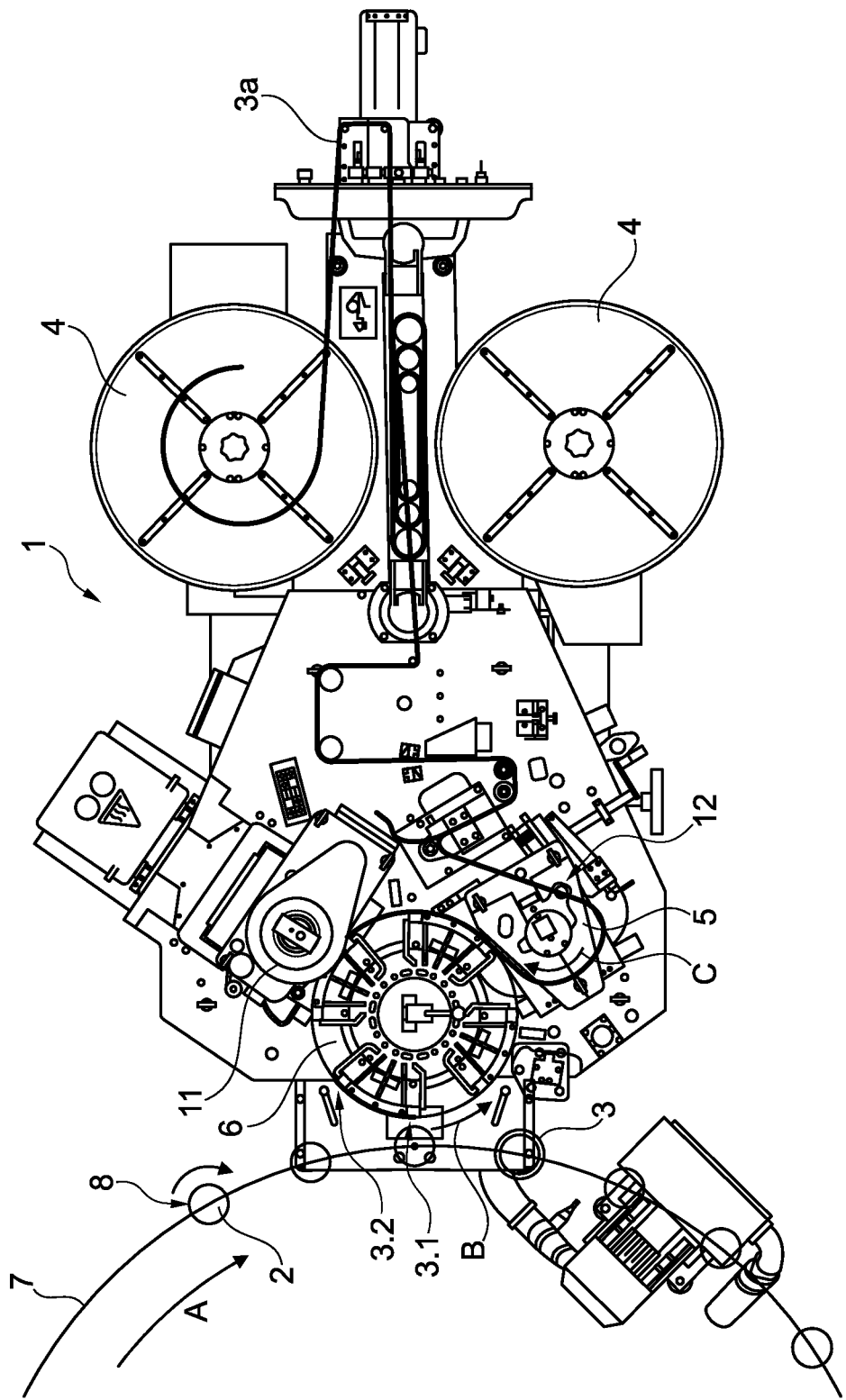
FIG. 1 shows a plan view of a labeling machine.
Figure 2:
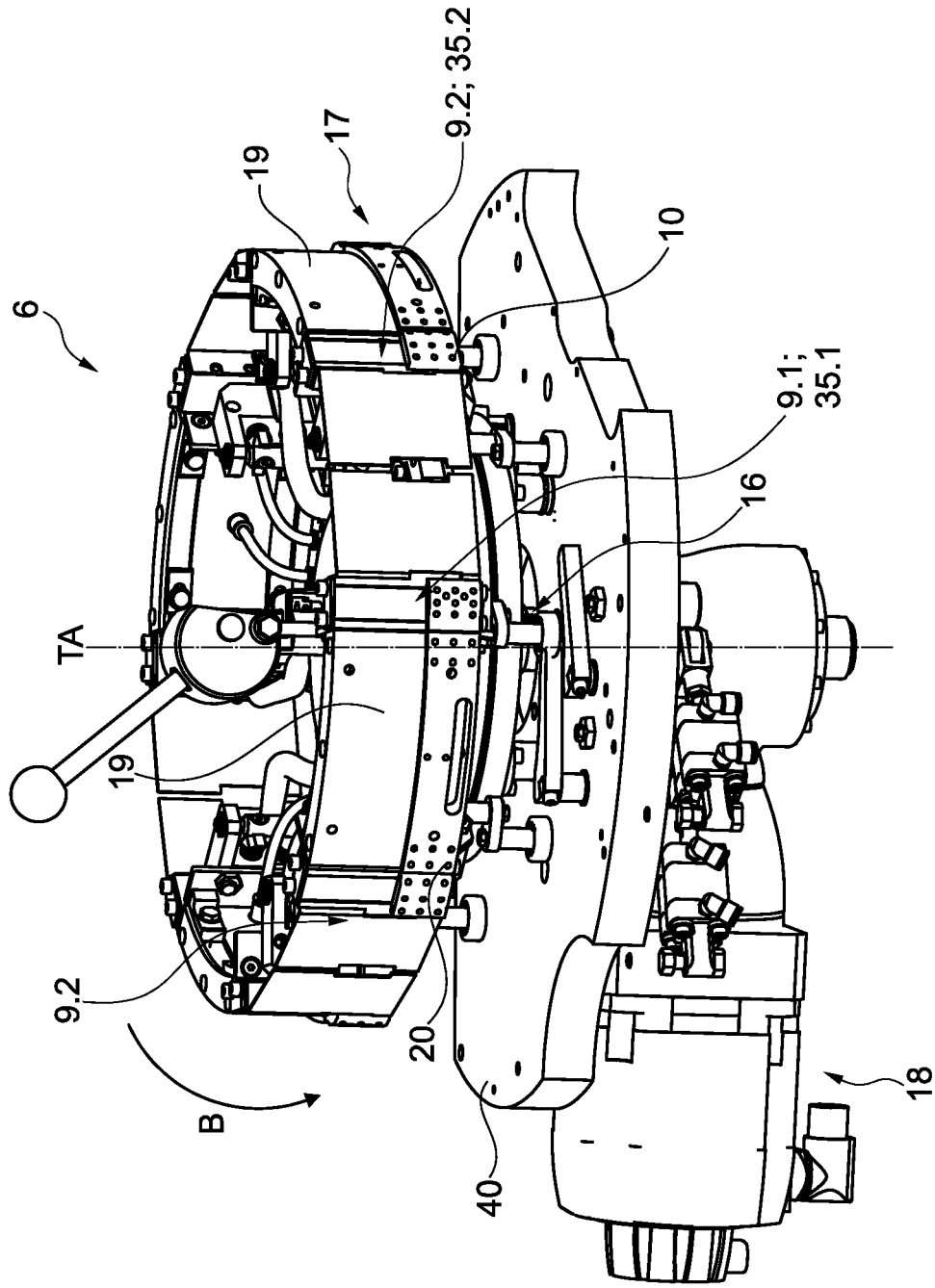
FIG. 2 shows a perspective view of the drum from the labeling machine of FIG. 1.

FIGS. 1 and 2 show a labeling unit 1 for labeling containers 2 with roll-fed labels 3. The labels 3 are drawn from a storage roll 4 of an endless belt of label material 3*a*.

Conveyor rollers draw labelling material 3*a* from the storage roll 4 and bring it to a cutter 5 in a manner that is synchronized with the rotor's rotation. The cutter 5 cuts the labelling material 3*a* to the required length to form a label 3. The cutter 5 comprises a cutting drum 12 that, during labeling, rotates about its own vertical drum axis in a cutting-drum direction C.

The labeling unit is disposed next to a rotor 7 that rotates in a rotor direction A. The rotor 7 has plural turntables 8 on its circumference. Each such turntable 8 carries a container 2 standing upright thereon.

A vacuum drum 6 rotates in a vacuum drum direction B that is opposite the cutting-drum direction C. The vacuum drum 6 carries labels 3 that it obtains from the cutter 5 and brings them towards a rotor 7 of the labeling machine. As the rotor 7 rotates in a rotor direction A, it brings containers 2 to the labeling machine. As a container 2 travel past the labeling machine, it receives a label.

At the labeling unit 1, a label's leading end 3.1 is attached to the container 3. The turntable 8 then turns the container 2 so that the container winds the label around itself. The label, as a result of its rear face having had glue applied thereto, then sticks to the container 3.

Figure 3:
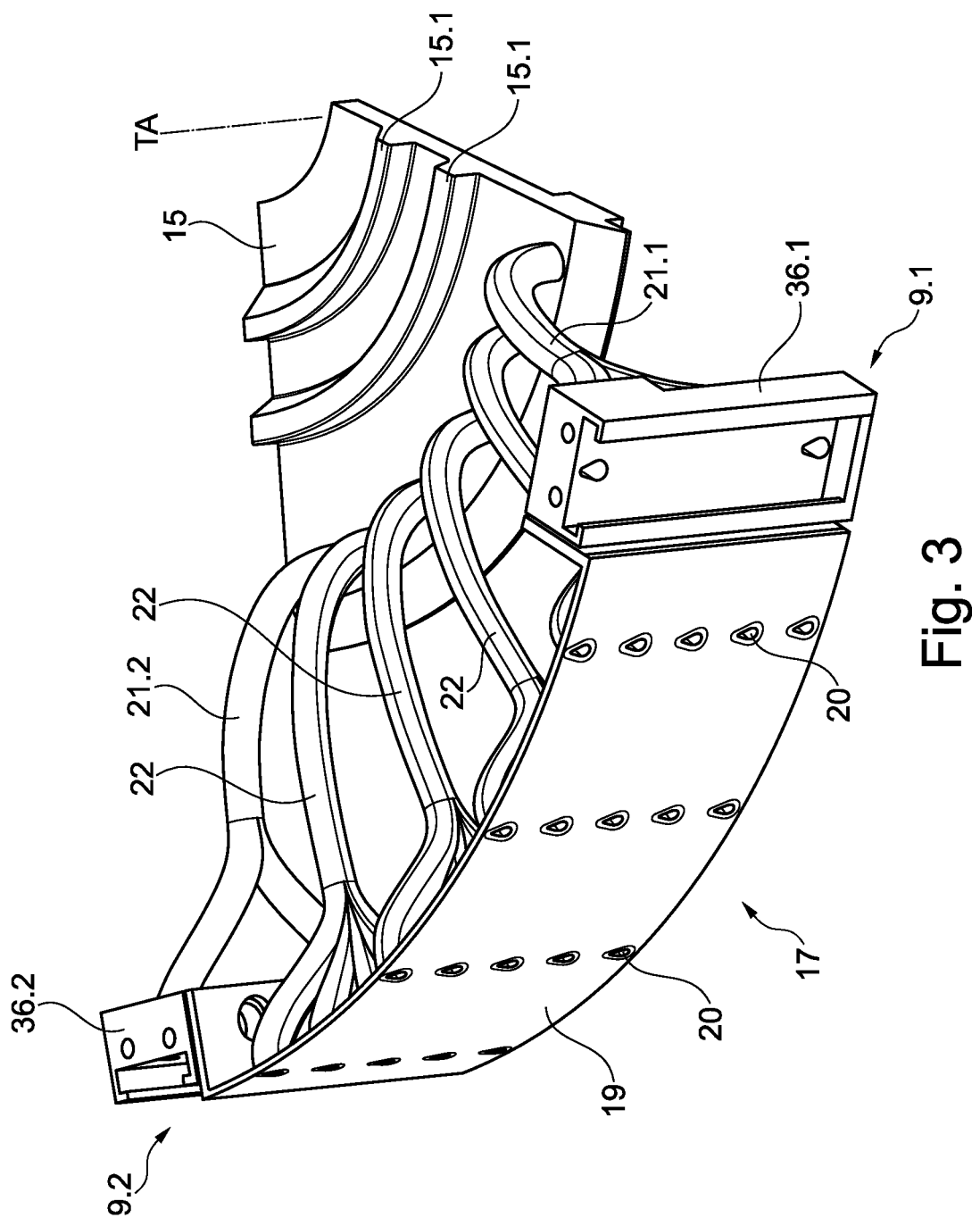
FIG. 3 shows a detached segment from a vacuum drum.

Referring now to FIG. 3, the vacuum drum 6 comprises multiple parts, each of which is formed by a segment 17. These identical segments 17 are distributed around the drum's axis TA like slices of a pie. Each segment includes a vacuum-holder pair 9 having a leading vacuum-holder 9.1 and a trailing vacuum holder 9.2 for engaging the leading and trailing ends of a label.

The leading and trailing vacuum holders 9.1, 9.2 are offset along the drum's circumferential direction. Each of the leading and trailing vacuum holder 9.1, 9.2 includes a corresponding leading or trailing housing 36.1, 36.2. The circumferential surface of the drum between the first and second vacuum holders 9.1, 9.2 defines a label arc 19.

As can be seen in FIG. 2, each housing 36.1, 36.2 is also associated with a corresponding leading and trailing pads 35.1, 35.2 having openings 10 thereon. The leading pad 35.1 is at the leading vacuum holder 9.1 and hermetically sealed to the leading housing 36.1. The trailing pad 35.2 is at the trailing vacuum holder 9.2 and hermetically sealed to the trailing housing 36.2.

The openings 10 connect via a rotary coupling to a source of vacuum, which is then used to hold leading and trailing ends 3.1, 3.2 of the label 3. Upon receiving a label 3 from the cutter 5, a vacuum provided by the vacuum openings 10 holds the label so that it can be brought past a gluing station 11, which then applies glue to the label 3.

The label arc 19 also has suction openings 20 that connect to corresponding vacuum lines 22. The vacuum lines 22 connect via a rotating connection to a vacuum source. As a result, it is possible for a negative pressure to be produced both at the vacuum openings 10 of the vacuum pad 35.1, 35.2 and at the suction openings 20 of the label arc 19, for applying suction and therefore holding the labels 3.

Each segment 17 includes a lower carrier-plate 15 that is shaped like slice of pie, i.e., like a segment of a circle. The carrier plates 15 of the various segments 17 are arranged around a shaft 16 that coincides with the drum's axis TA.

The shaft 16 is guided through a base carrier 40 of the vacuum drum 6. As shown in FIG. 2, a drive 18 under the base carrier 40 rotates the shaft 16. A suitable drive 18 is an electric motor, and in particular, a servomotor. The base carrier 40 is fixed so as to be stationary with the segments 17 above it and the drive 18 below it. Vacuum lines 21.1, 21.2 extend from the carrier plate 15 to corresponding housings 36.1, 36.2.

One or more of the carrier plate 3, the vacuum-holder housings 36.1, 36.2, the vacuum lines 21.1, 21.2, and the label arc 19 of a segment 17 is produced by additive manufacturing.

As a result of having been manufactured by additive manufacturing, each vacuum line 21.1, 21.2 has sufficient mechanical strength to hold the vacuum-holder housing 36.1, 36.2 to which it connects in a fixed position on the carrier plate 15. In some embodiments, the vacuum-holder housing 36.1, 36.2, the carrier plate 15, and the vacuum lines 21.1, 21.2 form a single monolithic or unitary structure that cannot be taken apart. Such a monolithic structure is manufactured by using an additive manufacturing method.

The label arc 19 is likewise arranged on the carrier plate 15. In some embodiments, the label arc 19, the vacuum lines 22 connecting it to the carrier plate 15, and the carrier plate 15 define a single monolithic or unitary structure that cannot be taken apart. Such a monolithic structure is manufactured by using an additive manufacturing method. As a result of having been manufactured using an additive manufacturing method, the vacuum lines 22 have sufficient mechanical strength to hold the label arc 19 to the carrier plate 15 in a fixed position.

In some embodiments, the label arc 19, the carrier plate 15, the vacuum lines 22, 21.1, 21.2, and the vacuum-holder housings 36.1, 36.2 form a single monolithic structure manufactured using additive manufacturing.

By using additive manufacturing, it becomes possible to form different parts of a structure with different materials. In some embodiments, the carrier plate 15 comprises arcuate sections 15.1 that are made from a material that is more elastic than other portions of the carrier plate 15. As shown in FIG. 3, the arcuate sections 15.1 need not be coplanar with the remainder of the carrier plate 15 but can instead project in the axial direction above or below the carrier plate 15. These arcuate sections are useful for forming screwing or clamping surfaces to compensate for manufacturing tolerances.

Figure 4:
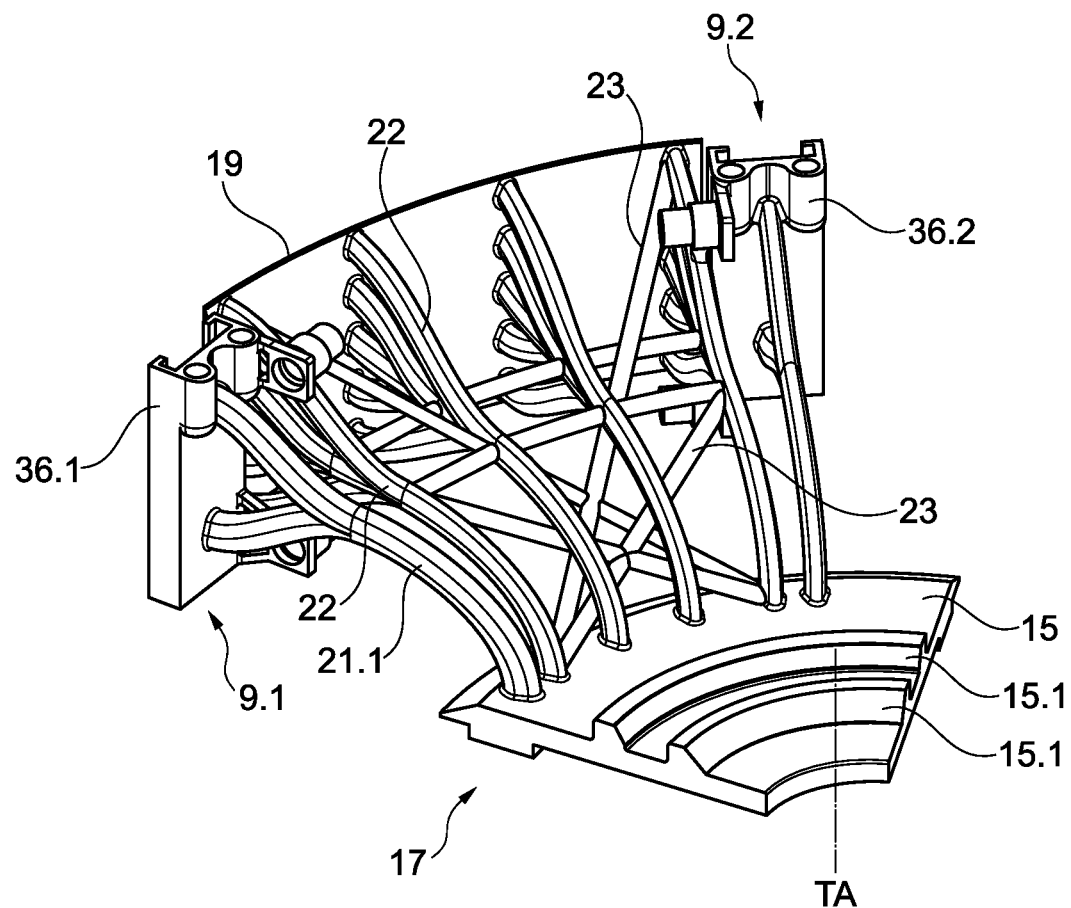
FIG. 4 shows another embodiment of a detached segment from a vacuum drum.

To provide further support, it is useful to have one or more struts 23, as shown in FIG. 4. Such struts 23 extend between other components, such as between two vacuum channels 21.1, 21.2, 22, between the label arc 19 and the carrier plate 15, and/or between a vacuum channel 21.1, 21.2, 22 and the carrier plate 15. Such struts 23 can be made by additive manufacturing so as to form part of a monolithic unitary structure that includes the foregoing components. These struts 23 form a framework that promotes stability of the additively-manufactured structure by providing support between the various parts thereof.

Embodiments include those in which the struts 23 are transverse struts, such as those that extend between a segment surface portion 13 and the carrier plate 15 or between a section of the label arc 19 facing towards the leading housing 36.1 and a region of the carrier plate 15 essentially opposite the trailing housing 36.2, and vice-versa, i.e. transversely to the label arc 19 or transverse to a plane extending transversely through the carrier plate 15. In particular, the struts 23 are therefore configured as transverse struts running transversely between the leading and trailing vacuum housings 36.1, 36.2.

Embodiments also include those in which the connecting struts 23 stretch horizontally so as to be essentially parallel to a plane stretching extending through the carrier plate 15 between two adjacent vacuum channels 21.1, 21.2, 22. Among such embodiments are those in which plural struts 23 are arranged essentially parallel to one another as well as parallel to the plane extending through the carrier plate 15.

Figure 5A:
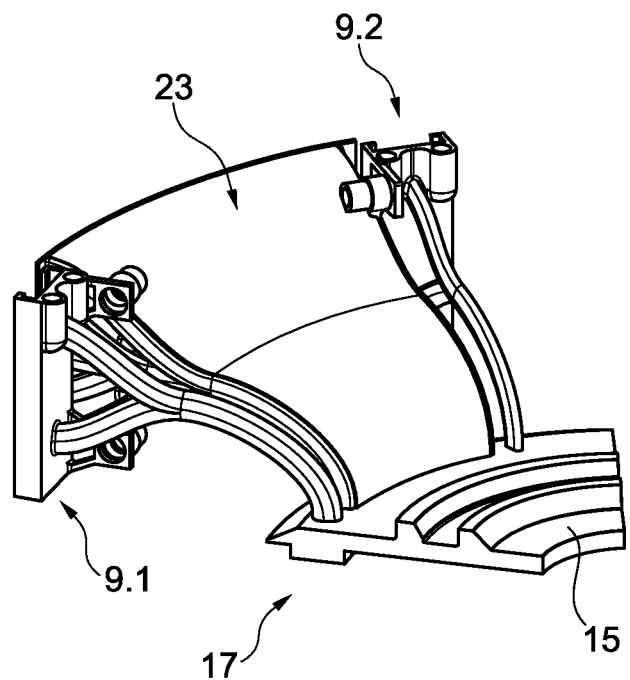
FIGS. 5*a* and 5*b* show perspective views of another embodiment of a detached segment from a vacuum drum.
Figure 5B:
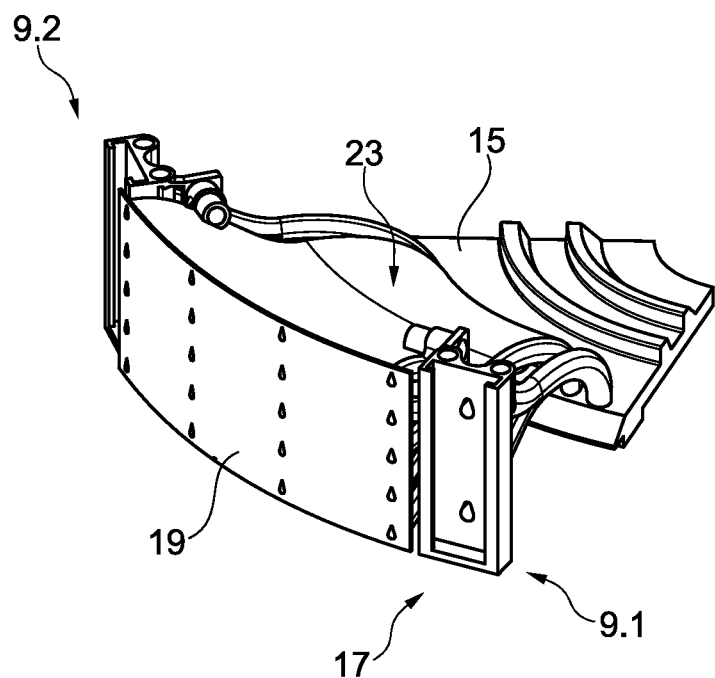
Figure 6:
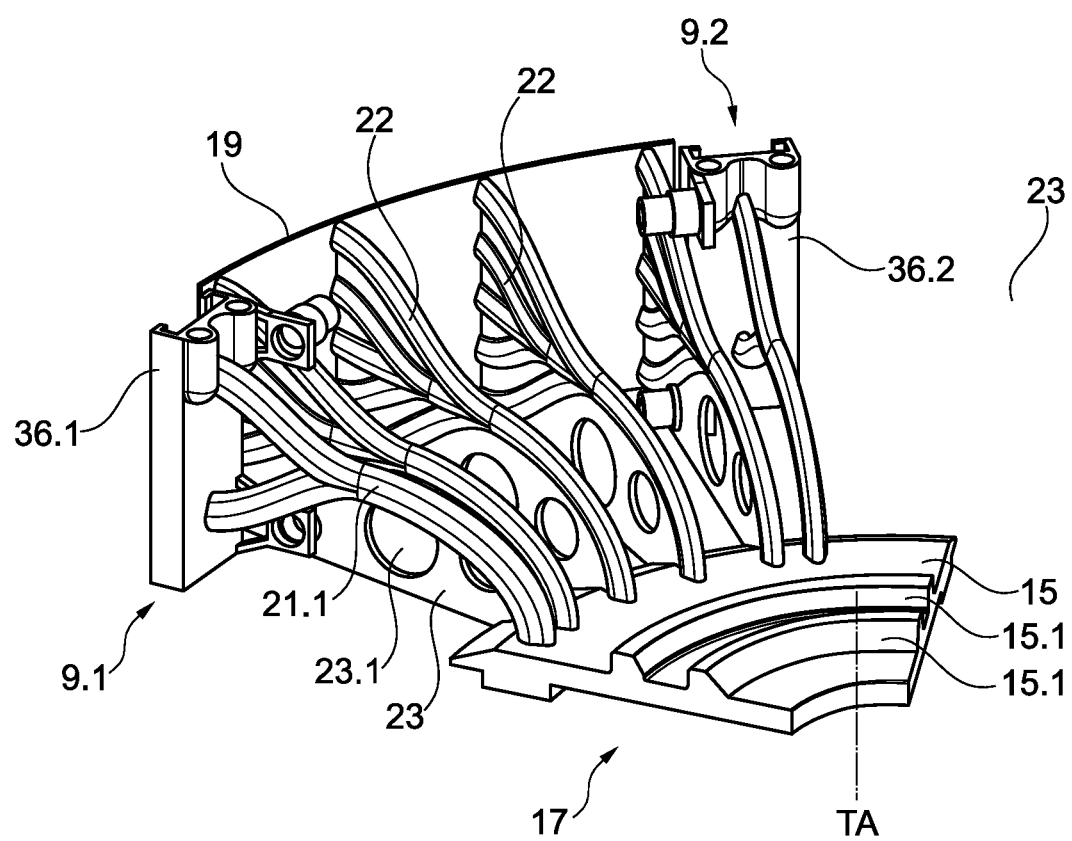
FIG. 6 shows a perspective view of another embodiment of a detached segment from a vacuum drum.
Figure 10:
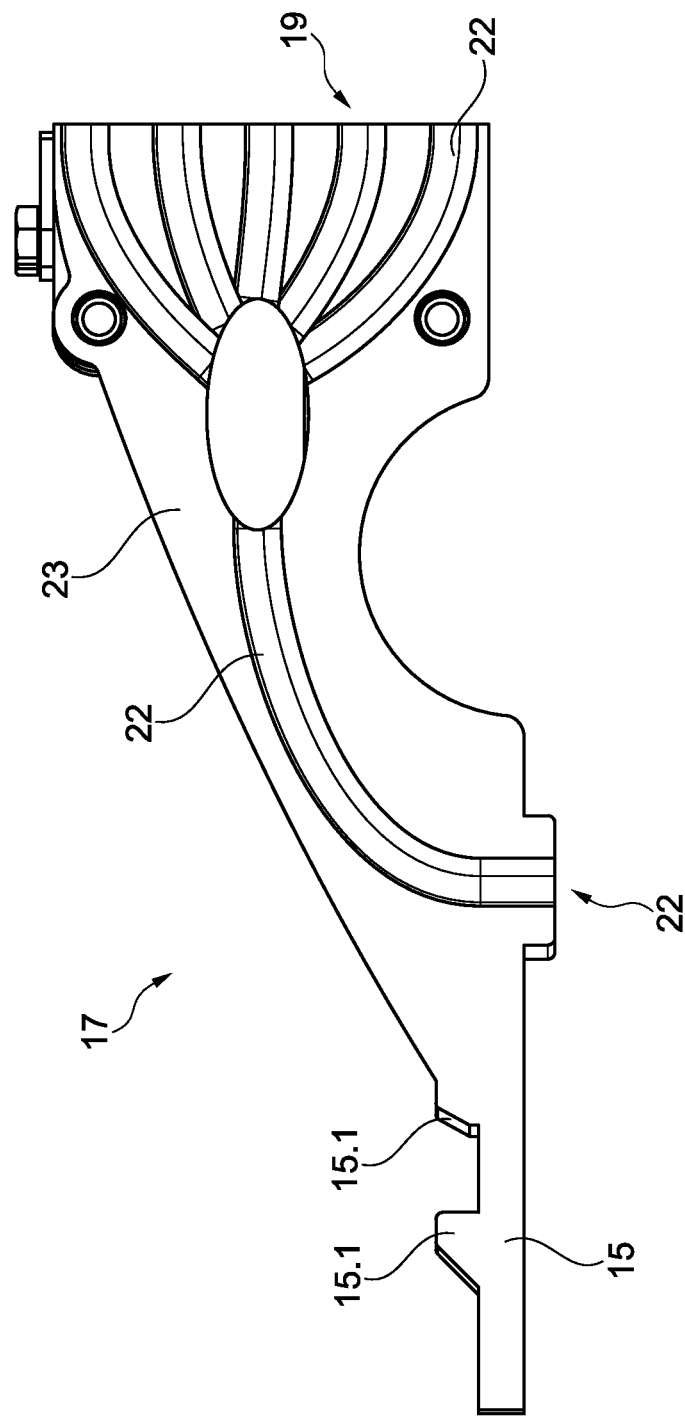
FIG. 10 is a lateral sectional view of an embodiment of a segment of a vacuum drum.

As can be seen from FIGS. 5a and 5b, as well as from the section from FIG. 10, embodiments include those that integrate the vacuum channels 22 into the struts 23. In some embodiments, a vacuum channel 22 is integrated into the struts 23 to provide a casing surface. The strut arrangement 23 provided as a casing surface advantageously extends in this situation along the label arc 19 between the leading and trailing holders 9.1, 9.2. In alternative embodiments, a vacuum channel 22 is integrated into a vertically-extending strut 23, as shown in FIG. 10 or 14.

Figure 14:
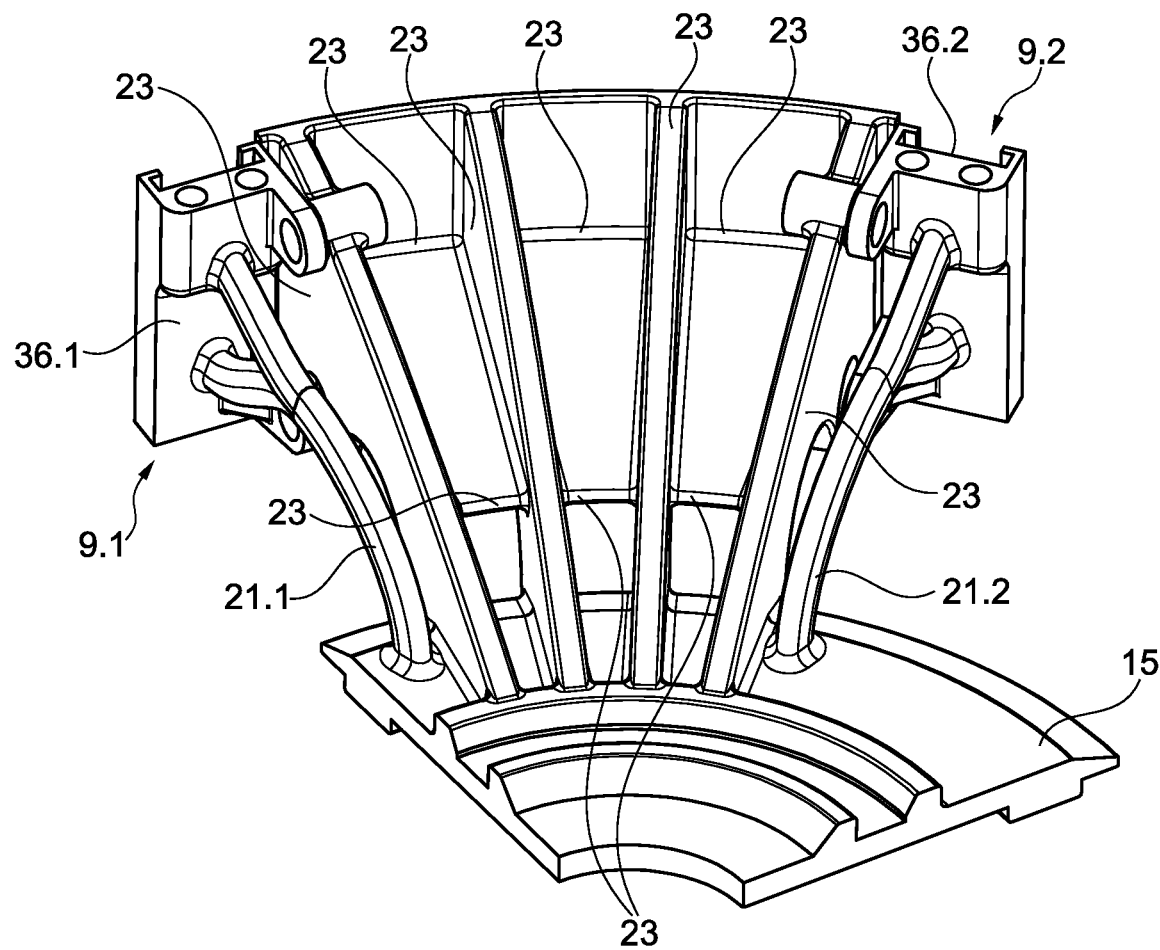
FIG. 14 is a perspective view of another embodiment of a detached segment from a vacuum drum.

FIG. 14 shows an embodiment in which vertically-aligned struts 23 form a fin that extends along the act length of a label arc 19. In some of these embodiments, there exist passages 23.1 through the resulting fin. The struts 23 extend between the carrier plate 15 and the label arc 19.

The presence of struts 23 running both horizontally and vertically is useful for providing a mechanically stable structure.

Figure 7:
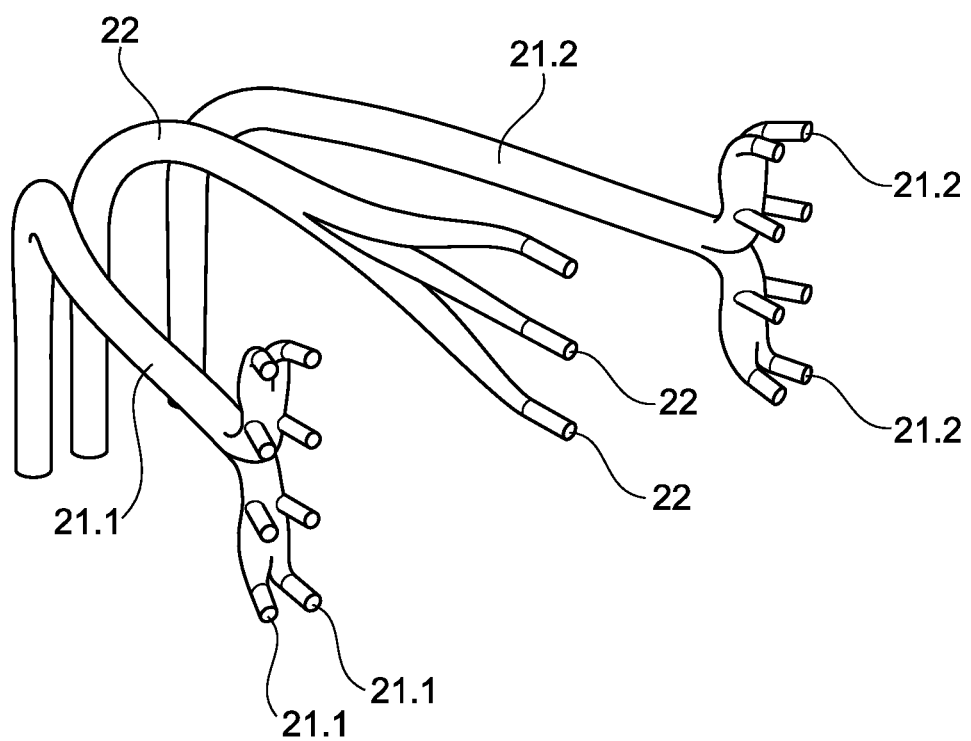
FIG. 7 shows detached vacuum lines from a segment of a vacuum drum.

In the embodiment shown in FIG. 7, each vacuum line 21.1, 21.2, 22 features an inner line track in which curved portions are shaped avoid abrupt changes along vacuum lines 21.1, 21.2, 22. This improvise flow characteristics within the vacuum lines 21.1, 21.2, 22 and permits reduction in the capacity of a central suction device. This saves both operating costs and required space. A suitable form is inner line track includes a tangential transition section, which avoids any abrupt constriction in cross section, sudden changes in diameter, and undesirable angles, such as edged transition sections with angles of less than ninety degrees.

Preferably, the inner line tracks of the vacuum lines 21.1, 21.2, 22 is arranged such that the openings 10 at the leading and trailing vacuum holders 9.1, 9.2 and along the radially-outward surface of the segment 17 or the label arc 19 all apply the same negative pressure.

Figure 8:
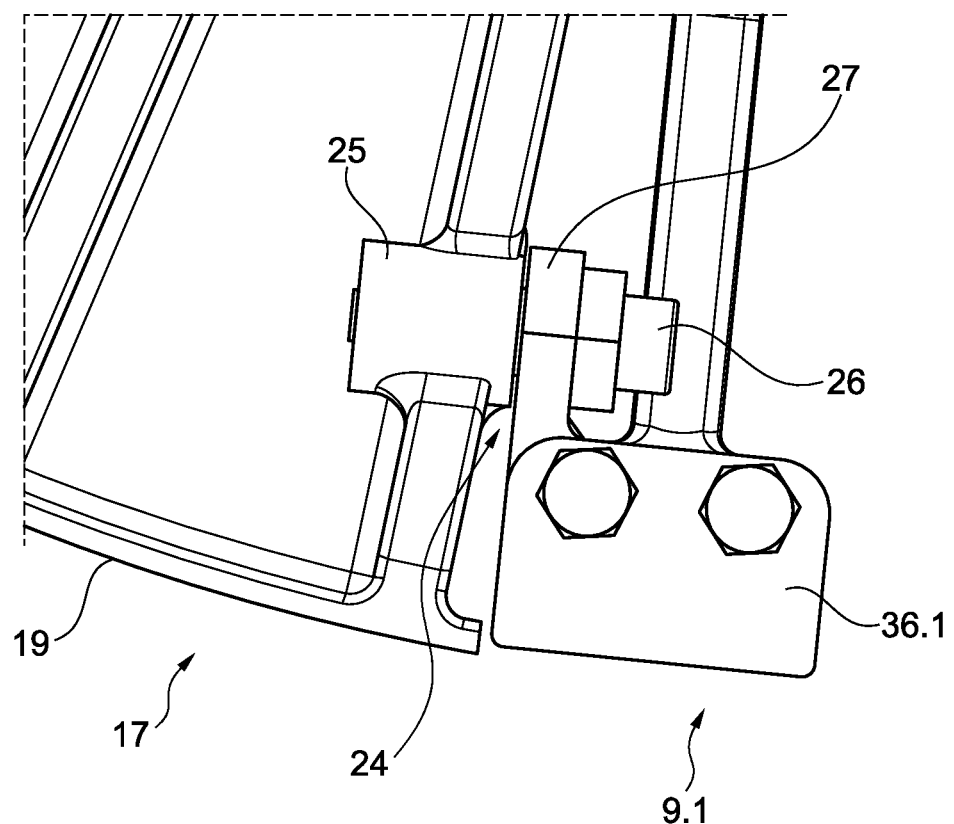
FIG. 8 shows a view from above a connection of a vacuum holder to a portion of a segment.
Figure 9:
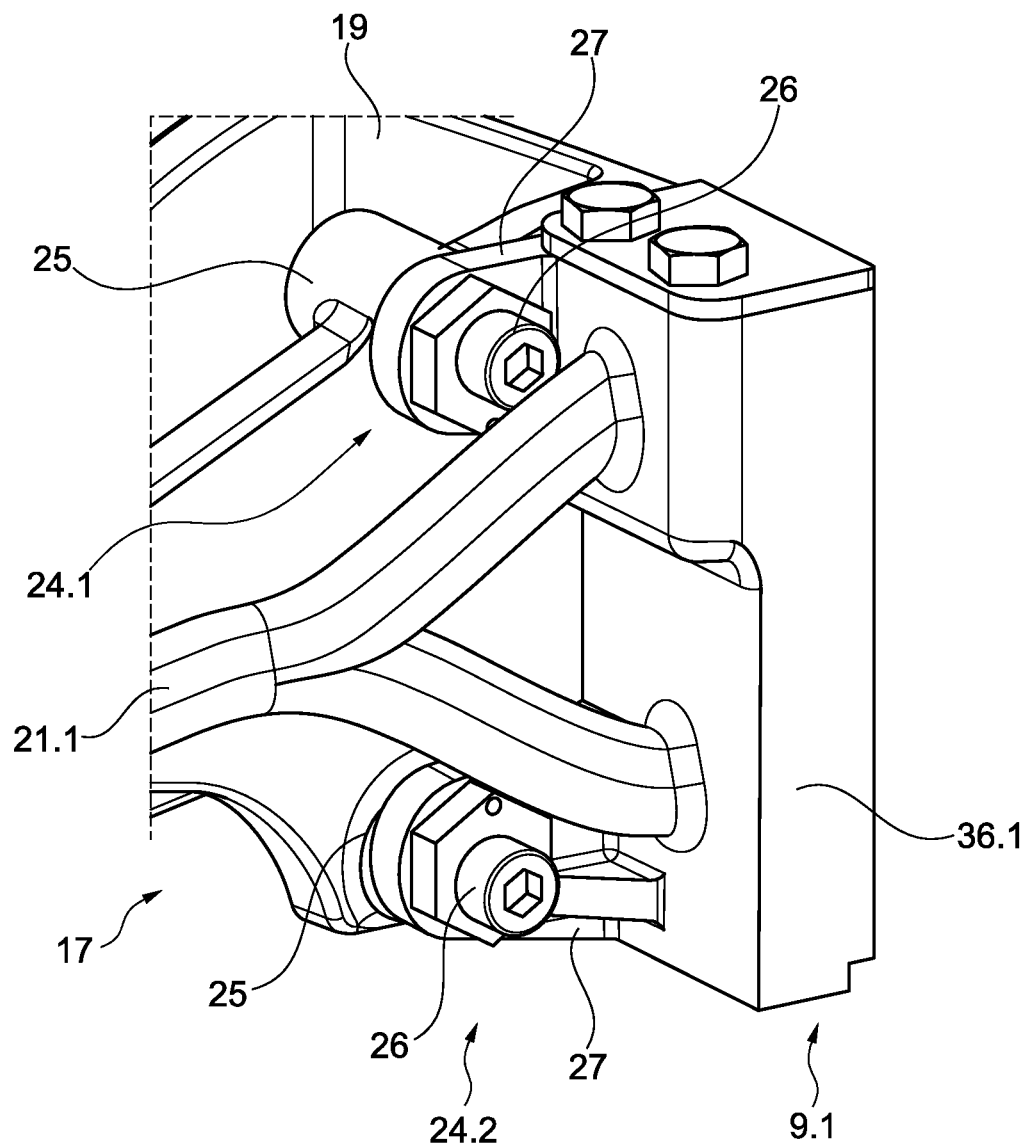
FIG. 9 shows a perspective view of a connection of a vacuum holder to a segment.

As shown in FIGS. 8 and 9, each housing 36.1, 36.2 features an adjuster 24 for adjusting the housings 26.1, 26.2 to the label arc 19 associated with that segment 17.

In a preferred embodiment, the adjuster 24, configured as an eccentric element, at the label arc 19 and in particular in its end region on the free end side, facing the respective vacuum holder housing 36.1, 36.2, provides an eccentric element receiver 25, integrated in which is a rotatably mounted control disk, with a receiver provided outside the mid-point for a securing means 26, forming the shaft of the eccentric element.

The securing means 26 secures the housing 36.1, 36.2 to the eccentric element receiver 25 in a secure but nevertheless detachable manner. It does so by using a vacuum housing holder 27 provided at the housing. In a preferred embodiment, the securing means 26 connects using a screw having a shaft. If the securing means 26 is now slightly released, its shaft can rotate the control disk that is rotatably arranged in the eccentric element receiver 25. In doing so, it adjusts the relative positioning of the vacuum holder housing 36.1, 36.2 to the drum axis TA and the label arc 19 respectively.

Referring now to FIG. 9, it is useful to have upper and lower adjusters 24.1, 24.2 to provide an additional degree of adjustability. The upper and lower adjusters 24.1, 24.2 are at the label arc 19 belonging to the segment 17. The upper and lower adjustment devices 24.1, 24.2 are spaced at a distance away from the respective end region on the free end side of the label arc 19 of a segment. Preferably, both the upper as well as the lower adjustment device 24.1, 24.2 are eccentric adjustment devices.

Figure 11:
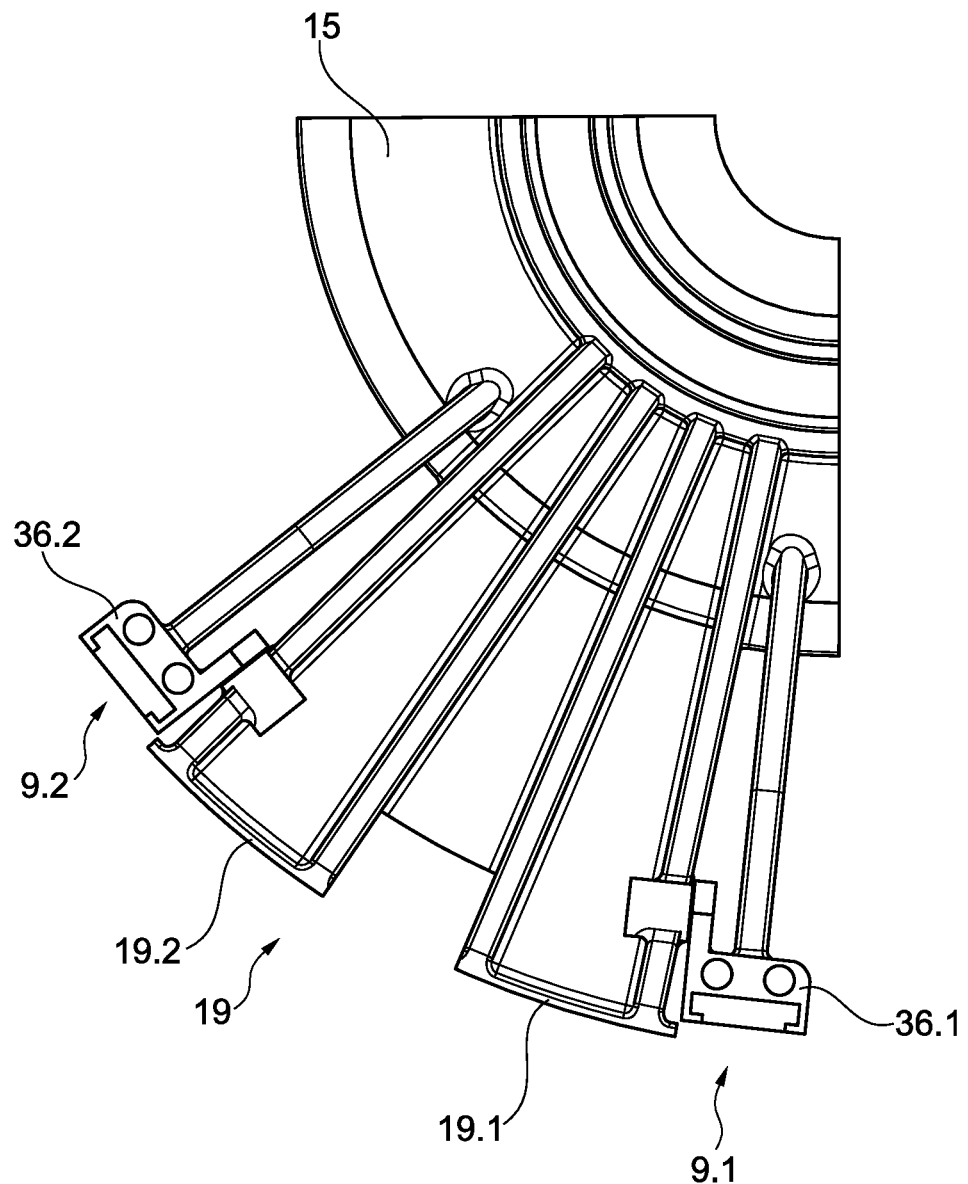
FIG. 11 is a plan view of an embodiment of a detached segment of a vacuum drum.
Figure 12:
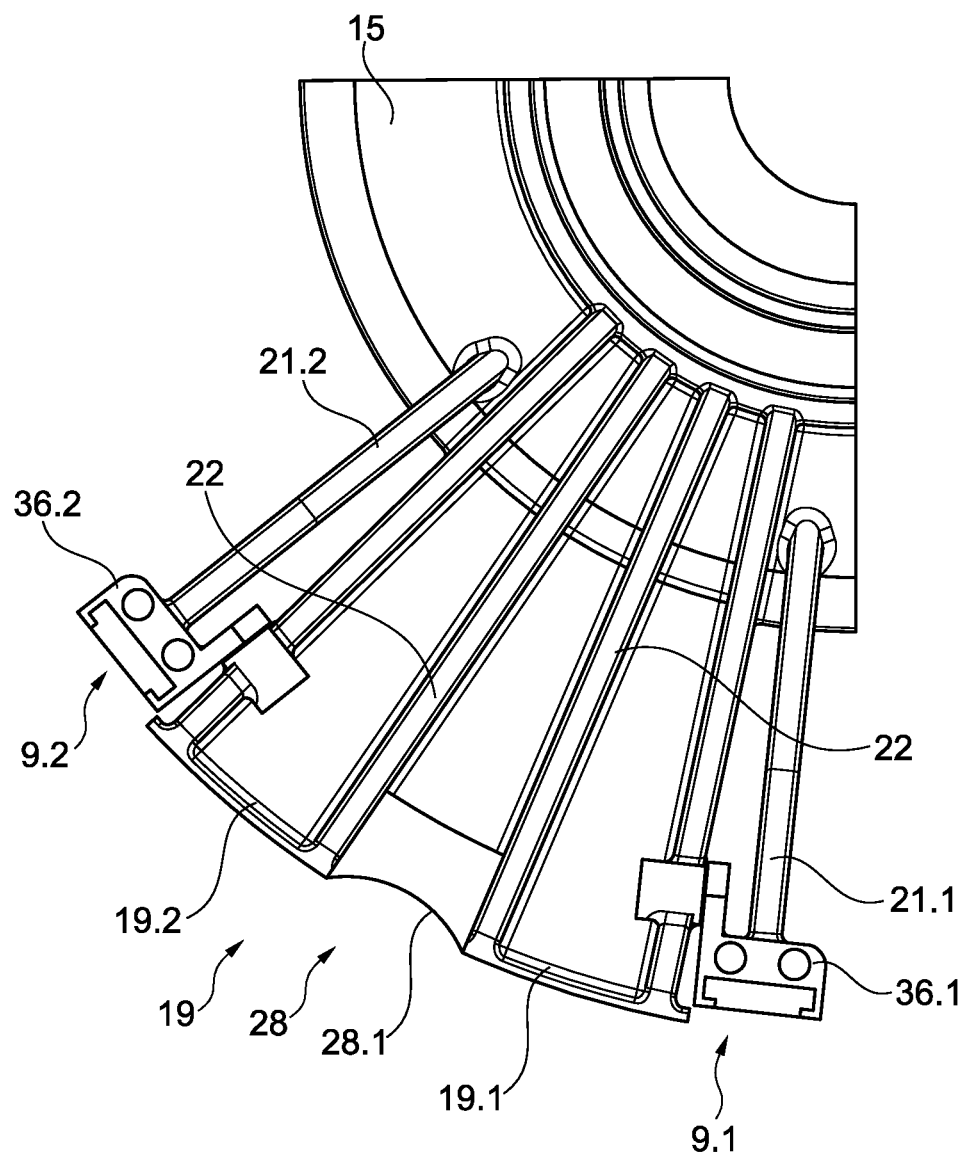
FIG. 12 is a plan view of another embodiment of a detached segment of a vacuum drum.
Figure 13:
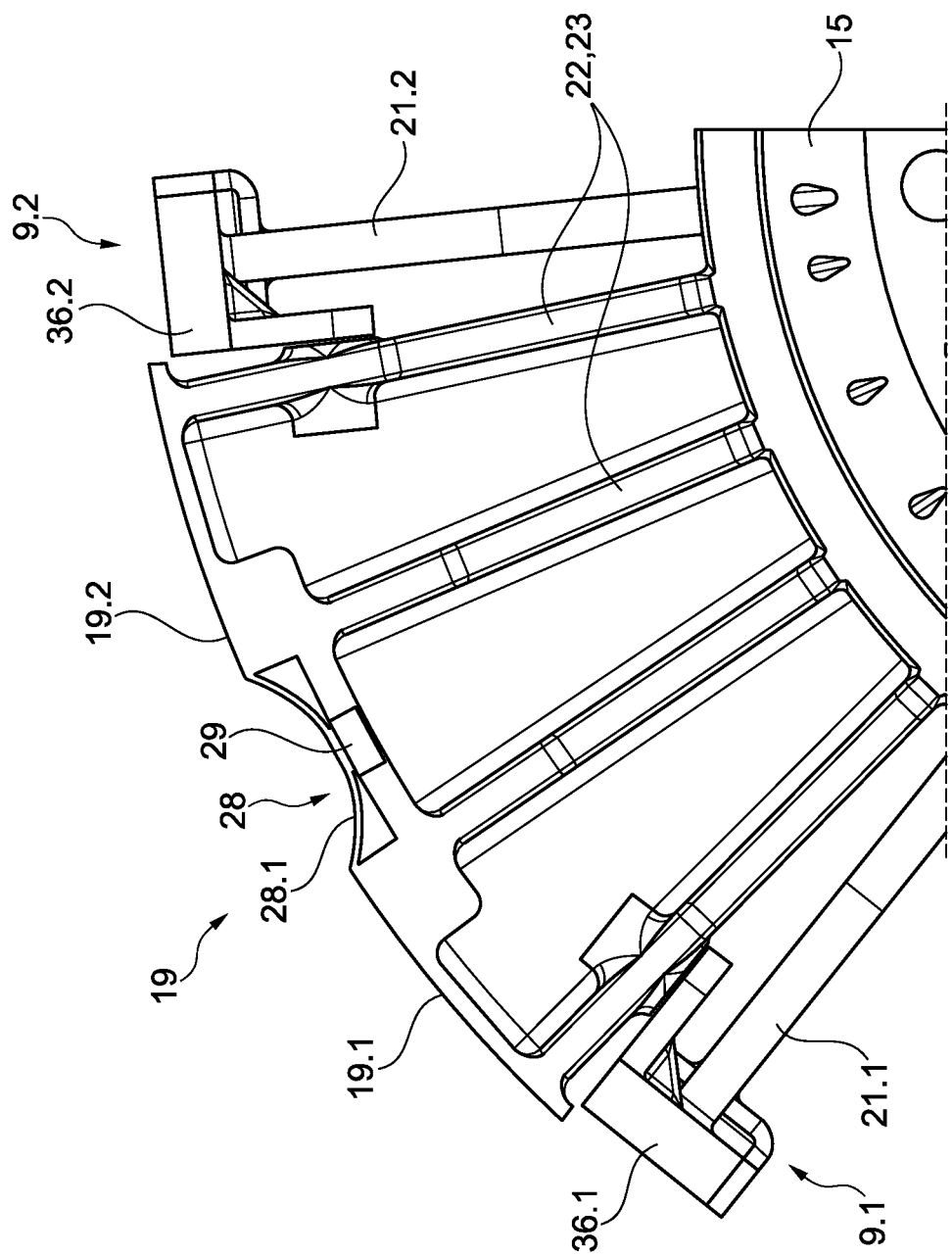
FIG. 13 is a plan view of another embodiment of a detached segment from a vacuum drum.

In another embodiment, shown in FIGS. 11-13, the label arc 19 is multi-part label arc 19. In the illustrated embodiment, the label arc 19 has first and second label-arc parts 19.1, 19.2, both of which are produced by additive manufacturing and both of which are part of a monolithic structure that includes the segment's carrier 15.

The embodiment of FIG. 12 shows a looped shaft 28 between the first and second label-arc parts 19.1, 19.2 by means of which the effective circular-arc length of the label arc 19, with which the label 3 is in contact, can be changed. The looped shaft 28 comprises a cambered portion 28.1, cambered radially inwards and extending between the first and second label-arc parts 19.1, 19.2. The camber is thus directed towards the drum axis TA. This camber causes the effective circular-arc segment length to be greater than what it would have been without the camber, i.e., the circular-arc segment length of the two label-arc parts 19.1, 19.2 lying on a common radius. In some embodiments, the looped shaft 28 is produced by an additive manufacturing method to form part of a monolithic structure, i.e., a one-piece structure, with the remaining label arc 19.

In some embodiments, the cambered portion 28.1 is made from a flexible material, such as an elastically deformable material. Such a structure, with two different materials, is easily created using an additive-manufacturing method.

A screw 29, best seen in FIG. 13, enables one to adjust the extent to which the cambered portion 28.1 is cambered, and therefore, the effective circular-arc segment length. The screw 29 pre-tensions the cambered portion 28.1, which is flexible, in the direction of the drum axis TA. If the screw 29 is rotated outwards, the flexible cambered portion 28.1, due to its elastic deformability, can again be directed away from the drum axis TA. This results in a simple way to adjust the effective circular-arc length can be achieved.

In preferred embodiments, there different segments that have been pre-configured to particular label lengths are coded, by color or some other feature, to make it easier for operating personnel to recognize the correct segment so as to quickly place the correct segments 17 on the labeling machine. The code can be incorporated into the segment 17 using the additive manufacturing process.

The invention has been described heretofore on the basis of exemplary embodiments. It is understood that numerous modifications and derivations are possible without thereby departing from the inventive thinking underlying the invention. The claims are deemed to be a constituent part of the description.

The invention claimed is:

1. An apparatus comprising a vacuum drum for a labelling unit of a labelling machine that labels containers with a label having a first end and a second end, said vacuum drum being rotatable about a drum axis and comprising a plurality of segments, said segments being arranged next to each other along a circumferential direction of said vacuum drum so as to collectively form a circumferential surface of said vacuum drum, wherein said segments comprise a first segment that comprises a first vacuum-holder that holds said first end, a second vacuum-holder that holds said second end and that is offset from said first vacuum-holder along said circumferential surface of said vacuum drum, a carrier plate, and a label arc between said first and second vacuum holders, wherein said first vacuum-holder comprises a first housing and said second vacuum holder comprises a second housing, wherein said first segment comprises a vacuum line that supports said first housing on said carrier plate, and wherein said vacuum drum is manufactured by carrying out an additive manufacturing process to manufacture said vacuum line and at least one structure selected from the group consisting of said carrier plate, said first housing, and said label arc.

2. The apparatus of claim 1, wherein said first segment comprises a casing surface into which a vacuum channel is integrated and wherein said casing surface provides support for a structure of said segment.

3. The apparatus of claim 1, wherein said first segment comprises an adjuster on said label arc and wherein said first housing is adjustable relative to said drum axis by said adjuster.

4. The apparatus of claim 1, wherein said label arc is a multi-part label arc that comprises first and second label-arc parts.

5. The apparatus of claim 1, wherein said first segment further comprises a looped shaft between first and second label-arc parts of said label arc, said looped shaft being configured to permit an effective length of said label arc to be changed.

6. The apparatus of claim 1, wherein each segment in said plurality of segments is identical to said first segment.

7. The apparatus of claim 1, wherein said first segment comprises a coding that codes a first label-type, wherein said first segment is configured to hold labels of said first label-type, and wherein all segments in said plurality of segments that are configured to hold labels of said first label-type comprise the same code.

8. A method comprising producing a vacuum drum a vacuum drum for a labelling unit of a labelling machine that labels containers with a label having a first end and a second end, said vacuum drum being rotatable about a drum axis and comprising a plurality of segments, said segments being arranged next to each other along a circumferential direction of said vacuum drum so as to collectively form a circumferential surface of said vacuum drum, wherein said segments comprise a first segment that comprises a first vacuum-holder that holds said first end, a second vacuum-holder that holds said second end and that is offset from said first vacuum-holder along said circumferential surface of said vacuum drum, a carrier plate, and a label arc between said first and second vacuum holders, wherein said first vacuum-holder comprises a first housing and said second vacuum holder comprises a second housing, wherein producing said vacuum drum comprises carrying out an additive manufacturing process to manufacture at least one structure selected from the group consisting of said carrier plate, said first housing, and said label arc, wherein said first segment comprises a vacuum line that supports said first housing on said carrier plate, and wherein producing said vacuum drum further comprises manufacturing said vacuum line using an additive manufacturing process.

9. The method of claim 8, wherein producing said vacuum drum further comprises manufacturing said vacuum line and said carrier plate in a common additive manufacturing process to produce a monolithic structure that comprises both said carrier plate and said vacuum line.

10. The method of claim 8, wherein manufacturing said vacuum line further comprises manufacturing said vacuum line so as to transfer a weight of said label arc relative to said carrier plate.

11. The method of claim 8, wherein said vacuum line holds said label arc at a fixed position relative to said carrier plate and wherein producing said vacuum drum further comprises manufacturing said vacuum line, said carrier plate, and said label arc using an additive manufacturing process to produce a monolithic structure that comprises said vacuum line, said carrier plate, and said label arc.

12. The method of claim 8, wherein manufacturing said vacuum line using said additive manufacturing process comprises manufacturing said vacuum line between said carrier plate and said first vacuum holder and manufacturing said vacuum line so as to have a path that comprises a curve section that forms a tangential transition.

13. The method of claim 8, wherein manufacturing said vacuum line using said additive manufacturing process comprises manufacturing said vacuum line between said carrier plate and said label arc, said vacuum line having a path that comprises a curve section that forms a tangential transition.

14. The method of claim 8, wherein manufacturing said vacuum line using said additive manufacturing process comprises manufacturing said first vacuum line such that said first vacuum line has an inner diameter that is selected such that all vacuum lines that open radially outward apply the same negative pressure when connected to a common source of negative pressure.

15. The method of claim 8, wherein producing said vacuum drum further comprises using said additive manufacturing process to produce a strut between two structures in said first segment, said structures selected from the group consisting of vacuum channels, said label arc, and said carrier plate.

16. The method of claim 8, wherein producing said vacuum drum further comprises using said additive manufacturing process to produce a strut into which a vacuum channel is integrated, said strut extending between said carrier plate and said label arc in a vertical direction.

17. The method of claim 8, wherein producing said vacuum drum further comprises using said additive manufacturing process to produce a fin having a vacuum channel integrated therein wherein said fin is oriented to extend in a vertical direction.

18. The method of claim 8, wherein producing said vacuum drum further comprises forming first, second, and third struts, wherein said first and second struts extend in a vertical direction and said third strut extends between said first and second struts in a horizontal direction, and wherein said third strut is parallel to a plane that spans said carrier plate.

19. The method of claim 8, wherein producing said vacuum drum further comprises forming a casing surface into which a vacuum channel is integrated, wherein said casing surface provides support for a structure of said segment.

20. The method of claim 8, wherein producing said vacuum drum further comprises forming an adjuster on said label arc, wherein said first housing is adjustable relative to said drum axis by said adjuster.

21. The method of claim 8, wherein producing said vacuum drum further comprises forming said label arc such that said label arc comprises first and second label-arc parts.

22. The method of claim 8, wherein producing said vacuum drum further comprises forming a looped shaft between first and second label-arc parts of said label arc, said looped shaft being configured to permit an effective length of said label arc to be changed.

23. The method of claim 8, wherein producing said vacuum drum further comprises causing all segments of said drum to be identical to said first segment.

24. The method of claim 8, wherein producing said vacuum drum further comprises causing said first segment to comprise a code that codes a first label-type, wherein said first segment is configured to hold labels of said first label-type, and wherein all segments in said plurality of segments that are configured to hold labels of said first label-type comprise the same code.

25. The method of claim 8, wherein manufacturing said vacuum line using said additive manufacturing process comprises manufacturing a vacuum line that has sufficient mechanical strength to hold said first housing in a fixed position on said carrier plate.

26. The method of claim 8, wherein manufacturing said vacuum line using said additive manufacturing process comprises manufacturing a vacuum line that has sufficient mechanical strength to hold said label arc in a fixed position.

27. The method of claim 8, wherein said arc and said carrier plate define a monolithic structure and wherein said arc is made from a material that is more elastic than that from which other portions of said carrier plate are made.

28. The method of claim 8, wherein said at least one structure comprises said carrier plate.

29. The method of claim 8, wherein said at least one structure comprises said label arc.

30. The method of claim 8, wherein said at least one structure comprises said first housing.

31. The method of claim 8, further comprising using said additive manufacturing process to encode a different code into each of said segments.

32. The method of claim 8, further comprising using said additive manufacturing process to manufacture said segments in different colors.

33. The method of claim 22, wherein forming said looped shaft comprises using said additive manufacturing process to form said looped shaft.

34. The method of claim 22, wherein said looped shaft comprises a cambered portion that is cambered radially inward.

35. The method of claim 22, wherein said looped shaft comprises a cambered portion and wherein said method further comprises providing a screw that pre-tensions said cambered portion towards said drum axis.

\* \* \* \* \*